(12) United States Patent
Kim et al.

(10) Patent No.: US 8,920,617 B1
(45) Date of Patent: Dec. 30, 2014

(54) SELECTIVE PLATING FIXTURE

(75) Inventors: Do Yeon Kim, East Amherst, NY (US); Gregory J. Harding, Williamsville, NY (US); Richard W. Johnson, Jr., Middleport, NY (US); Kenneth M. Kirsten, Lancaster, NY (US); Eric J. Grotke, North Tonawanda, NY (US)

(73) Assignee: Greatbatch Ltd., Clarence, NY (US)

( * ) Notice: Subject to any disclaimer, the term of this patent is extended or adjusted under 35 U.S.C. 154(b) by 581 days.

(21) Appl. No.: 13/177,190

(22) Filed: Jul. 6, 2011

Related U.S. Application Data

(60) Provisional application No. 61/361,638, filed on Jul. 6, 2010.

(51) Int. Cl.
*B23H 7/26* (2006.01)
*B23H 11/00* (2006.01)
*C25B 9/00* (2006.01)
*C25C 7/00* (2006.01)
*C25D 17/00* (2006.01)
*C25F 7/00* (2006.01)

(52) U.S. Cl.
USPC ....... 204/297.05; 205/128; 205/134; 205/136

(58) Field of Classification Search
CPC .......... C25D 17/16; C25D 17/06; C25D 7/06; C25D 7/0607; C25D 5/02; C25D 5/022
USPC .............. 204/297.05; 205/134, 128, 136, 135
See application file for complete search history.

(56) References Cited

U.S. PATENT DOCUMENTS

| | | | |
|---|---|---|---|
| 4,374,004 A | 2/1983 | Salama | |
| 5,087,331 A | 2/1992 | Roll et al. | |
| 5,448,016 A | 9/1995 | DiPaolo et al. | |
| 5,869,139 A | 2/1999 | Biggs et al. | |
| 6,508,926 B1 * | 1/2003 | Falkner et al. | 205/118 |
| 7,402,519 B2 | 7/2008 | He et al. | |

FOREIGN PATENT DOCUMENTS

WO 9834277 8/1998

* cited by examiner

*Primary Examiner* — Luan Van
*Assistant Examiner* — Louis Rufo
(74) *Attorney, Agent, or Firm* — Steven W. Winn

(57) ABSTRACT

A plating fixture that affords improved control and process repeatability of the placement of material on a surface of a terminal lead is described. The thereby plated terminal lead is further incorporatable into an electrochemical cell. The plating fixture consists of a membrane that prevents migration of the electroplating chemicals along areas of the lead that are not desired. Furthermore, the fixture utilizes a setup plate that controls the length of the lead that is plated.

19 Claims, 8 Drawing Sheets

SELECTIVE PLATING FIXTURE

CROSS-REFERENCE TO RELATED APPLICATIONS

This application claims priority from U.S. Provisional Patent Application Ser. No. 61/361,638, filed Jul. 6, 2010.

FIELD OF THE INVENTION

The present invention generally relates to electroplating of a metallic coating on a surface. More specifically, this invention is directed to an electroplating fixture used to plate a surface of a terminal lead that is utilized in the conversion of chemical energy to electrical energy and, more particularly, to a glass-to-metal seal (GTMS) for hermetically sealing an electrochemical cell. The glass-to-metal seal is considered critical because it hermetically isolates the internal environment of a component from the external environment to which the component is exposed. In electrochemical cells powering implantable medical devices, the GTMS hermetically seals the internal cell chemistry from the external device environment.

PRIOR ART

Glass-to-metal seals of electrochemical cells generally consist of a ferrule sleeve secured to an opening in the cell casing, such as in the lid or in the casing body itself. The ferrule supports an insulating glass in a surrounding relationship and the glass in turn seals around the perimeter of a terminal lead. The terminal lead extends from inside the cell to a position outside the casing, and serves as the lead for one of the cell electrodes. Typically the terminal lead is connected to the cathode current collector. The casing including the lid serves as the second terminal for the other electrode, typically the anode. This configuration is referred to as a case-negative design.

To construct a glass-to-metal seal, insulating glass is provided in a ring shape to fit inside the ferrule sleeve or inside an opening in the casing body in a closely spaced relationship. The insulating glass has a hole through its center that receives the terminal lead in a closely spaced relationship. These components are assembled and then heated in a furnace. This heating step causes the glass to soften and flow into intimate contact with the inside of the ferrule and with the perimeter of the terminal lead. When the assembly cools, the insulating glass is bonded to the ferrule and the terminal lead.

Typically a layer of gold is applied to the surface of the terminal lead. This gold layer is beneficial in that it provides the terminal lead with a nonreactive surface that inhibits oxidation and provides for good electrical connection.

The current process requires that a layer of nickel is first adhered to the surface of the terminal lead. The nickel acts as an intermediary layer that promotes gold adhesion to the surface. The application of this nickel layer is therefore critical to properly adhere the gold to the surface of the terminal lead. Therefore, it is important that the nickel layer be precisely placed on the surface of the terminal lead to ensure the exact placement of consequent coating layers, particularly, gold on the surface of the lead.

Furthermore, it is generally accepted that nickel undesirably reacts with the chemistries within the electrochemical cell. Such chemical reactions could result in degradation of the cell's electrical performance. Therefore, the electrochemical assembly process requires exact precision of the placement of the nickel coating on the terminal lead's surface to minimize excess nickel coating which could be exposed and undesirably react with electrolytes of the cell.

Furthermore, the plating process requires that the gold layer be in contact with the nickel layer beneath. If the gold layer is not in contact with nickel, it is likely that a portion of the gold will not adhere to the surface of the lead. Such a lack of gold layer coverage on the surface of the lead may result in other electrical performance issues of the cell and/or device as previously mentioned.

What is desired is an electroplating fixture that ensures exact placement of the plating material or materials on the surface of the terminal lead. The improved electroplating fixture of the present invention provides improved control and process repeatability of the placement of a metal layer on the surface of the terminal lead, which is desired in the manufacturing process of electrochemical cells. The improved precision and repeatability of the application of the plated layer afforded by the present invention directly improves the performance and reliability of the electrochemical cell.

SUMMARY OF THE INVENTION

The present invention is directed to an electroplating fixture that improves the precision and repeatability by which a material is applied and adhered onto a surface. Specifically, the present invention improves the precision and repeatability by which a layer of metal is selectively applied to the surface of a terminal lead of an electrochemical cell. The electroplating fixture of the present invention secures a plurality of terminal leads therewithin such that during the electroplating process, the desired portion of the surface of each pin is precisely and uniformly plated around its circumference. In other words, the fixture of the present invention provides a terminal lead with a distinct demarcation line that delineates a plated surface portion from a non-plated, bare surface portion that is repeatably reproducible.

The electroplating fixture of the present invention comprises a membrane that seals around the circumference of the terminal lead. The membrane prevents migration or wicking of the electroplating chemicals along the surface of the lead, thereby preventing uneven plating, as well as plating locations that are not desired. In a preferred embodiment, the fixture of the present invention provides a distinct and uniform parallel, demarcation line that extends around the circumference of the lead and delineates the plated surface portion from the non-plated surface portion for a plurality of terminal leads.

The increased control, precision and repeatability of the plated surface, provided by the present invention, allows for increased precision and control of the application of additional layers of material that are applied to the initial plated surface. Such an improved application of additional layers afforded by the under coat plating, reduces waste and improves the efficiency by which electrochemical cells are manufactured.

Furthermore, the increase precision and control afforded by the invention improves safety and reliability of the electrochemical cell. Exacting control of the placement of a material, particularly nickel, on the terminal lead surface reduces the possibility of an undesirable reaction between the nickel metal and electrolyte chemistry within the cell. This undesirable reaction has been generally known to cause electrical performance and reliability issues within the cell.

These and other features of the present invention will become increasingly more apparent to those of ordinary skill in the art by reference to the following description and the appended drawings.

DETAILED DESCRIPTION OF THE PREFERRED EMBODIMENTS

Figure 1:
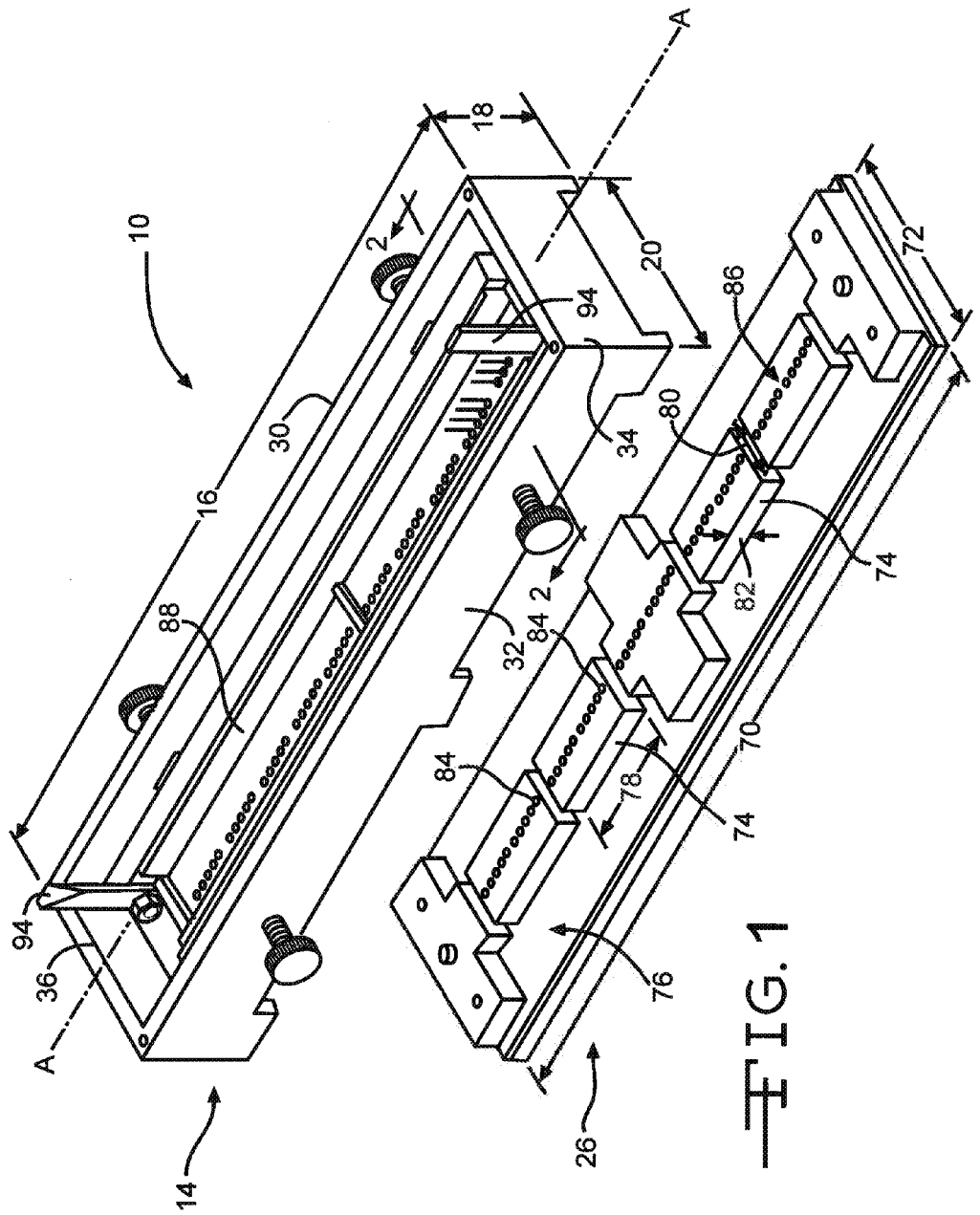
FIG. 1 is an exploded perspective view of the electroplating fixture of the present invention.

A typical hermetic glass-to-metal seal consists of a terminal lead electrically isolated from a ferrule or casing body by an insulating glass. The individual materials chosen for these applications are critical and must meet the following design criteria. First, the surface of the terminal lead must be corrosion resistant to the internal cell chemistry, be weldable and modifiable for attachment to the end users product. In addition, the surface should have sufficient electrical conductivity for the particular cell design. Secondly, the insulating glass needs to be corrosion resistant to the internal cell chemistry, and have sufficient electrical resistivity for the particular cell design. Lastly, the ferrule or casing body must be corrosion resistant to the internal cell chemistry, have sufficient electrical conductivity for the particular cell design, and be weldable for secondary operations.

When these components are manufactured into a glass-to-metal seal, accomplished by assembling the components together followed by heating in a furnace, the resultant seal must also meet the following design criteria: the assembly must be hermetic, and the insulating glass and terminal lead must exhibit acceptable visual characteristics. It is preferably desired that the surface of the terminal lead be free from oxidation, discolorations, blemishes and cosmetic defects. It is also desired that the glass adhere to the surface of the terminal lead, have no cracks that could affect function, and there must be sufficient electrical resistivity between the ferrule or casing body and the terminal lead for the cell design. Also, the glass-to-metal seal must exhibit acceptable thermal resistance to secondary processing such as welding and it must be mechanically tolerant to secondary processing such as terminal lead bending.

As such, the present invention embodies an electroplating fixture 10 that affords improved positional control and repeatability of the placement of the plated material on the surface of a terminal lead 12.

It is generally known that the nickel can be oxidized by the cathode materials typically used in electrochemical cells 110 (FIG. 8) to form nickel ions. These nickel ions dissolve in the electrolyte solution and diffuse in all directions within the cell 110. Typically, in a case-negative cell construction, these nickel ions migrate to a ferrule 134 where they electrochemically reduce to form nickel metal. The formed nickel metal generally deposits on the surface of the ferrule 134. As the nickel metal continues to deposit, a nickel metal "bridge" forms across the ferrule insulation band extending toward the terminal lead 12. Ultimately, an electrical short could result depleting the cell 110. Therefore, it is important that the placement of the layer of plated metal, particularly nickel, on the surface of the terminal lead be controlled with exact precision.

Turning now to the drawing FIGS. 1 to 6, an exemplary embodiment of the electroplating fixture 10 of the present invention is shown. The fixture 10 comprises a main body 14 having a length 16, a depth 18 and a width 20. A membrane 22 residing along a bottom surface 24 of the main body 14 serves as a gasket for the fixture 10. As the terminal leads 12 are placed into the fixture 10, they pierce through the membrane 22 creating a tight liquid seal about the lead perimeter. A set plate 26 is initially positioned at the bottom of the main body 14 during setup of the fixture 10. This set plate 26 uniformly determines the length of the terminal leads 12 that extend below the bottom of the fixture 10. Residing within the main body 14 is an electrode sub-assembly that provides an electrical connection between a power source 98 (FIG. 6) and the terminal leads 12.

In a preferred embodiment, the main body 14 is of a general rectangular shape with an elongated length 16 that extends along a longitudinal axis A-A. Although a general rectangular shape is preferred, it is contemplated that the main body 14 could generally be of a shape not limited to round, square, triangular and the like. The main body 14 has a base 28 that is surrounded by four walls. A left sidewall 30 and a right sidewall 32 form the length 16 of the main body 14. A front sidewall 34 and a back sidewall 36 form the width 20 of the main body 14. The base 28 of the fixture 10 extends parallel to the longitudinal axis A-A at the bottom portion of the fixture 10. In a preferred embodiment, the length 16 of the main body 14 ranges from a about 25 cm to about 50 cm, the width 20 ranges from about 5 cm to about 10 cm and the depth 18 ranges from about 5 cm to about 25 cm.

In a preferred embodiment, a plurality of openings 38, extend through the base 28 of the main body 14. These openings are preferably in a perpendicular orientation to the longitudinal axis A-A and dimensioned such that the diameter of the terminal lead 12 fits therewithin. More preferably, the plurality of openings 38 are aligned in a linear row that extends along the length of the base 28, parallel to the longitudinal axis A-A. Although the embodiments shown in FIGS. 1, 2, 4 and 5 illustrate a single linear row of openings 38, it is contemplated that there may be multiple rows of openings 38. Furthermore, these openings 38 may not necessarily be oriented in a linear orientation along longitudinal axis A-A. In any event, it is preferred that each opening 38 is electrically isolated from its adjacent openings 38. In a preferred embodiment, each opening 38 has a diameter ranging from about 0.02 cm to about 0.2 cm, and a length ranging from about 0.5 cm to about 2.0 cm. It is further preferred that each opening 38 is separated from its adjacent opening 38 by at least about 0.5 cm.

Figure 3:
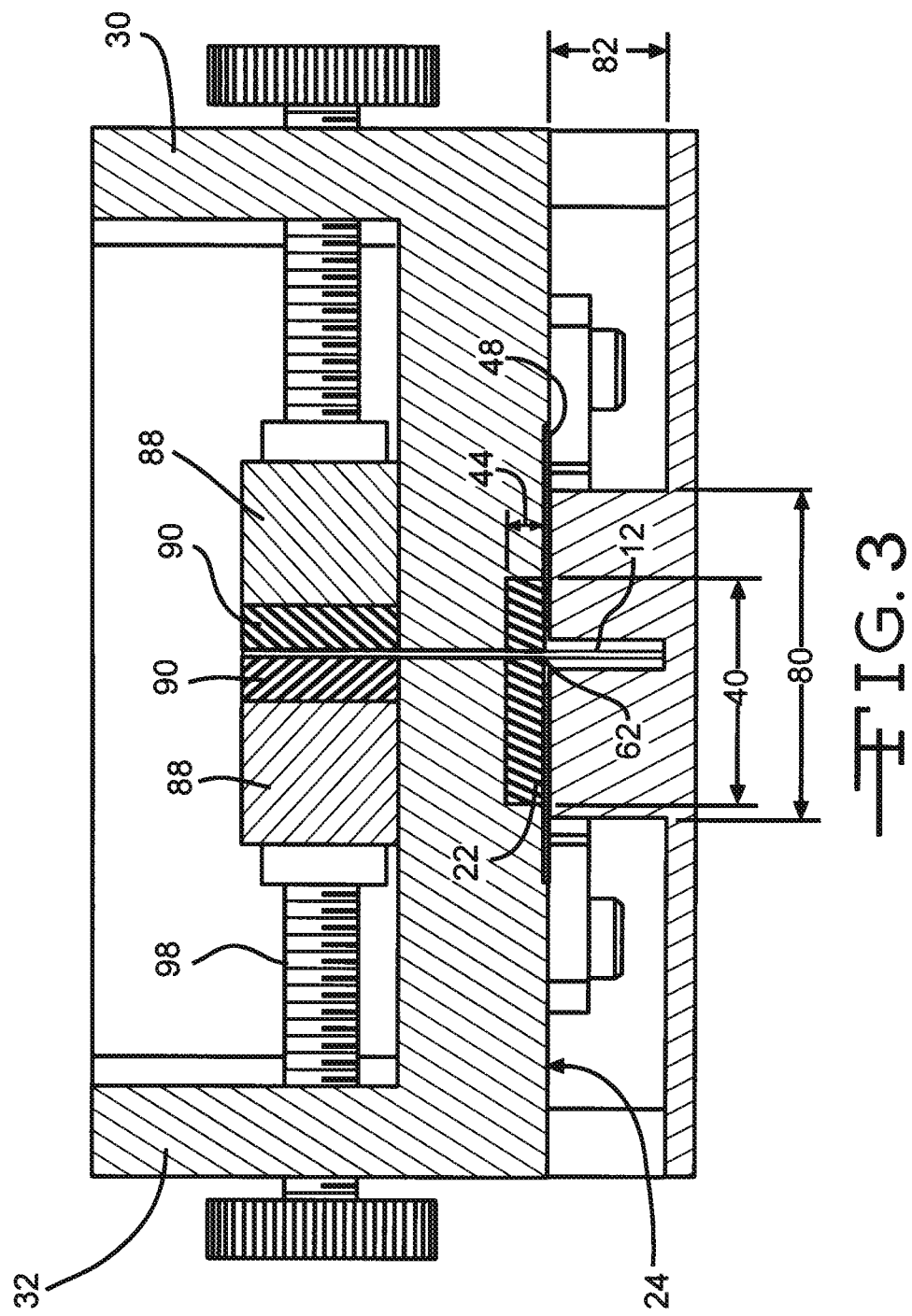
FIG. 3 is a magnified cross-sectional end view of an embodiment of a terminal lead secured in the fixture.

In a preferred embodiment, the membrane 22, having a membrane width 40, a membrane length 42 and the membrane depth 44, is positioned along the bottom surface 24 of the base 28 of the main body 14. More preferably, the membrane 22 is positioned within a cavity 46 that resides within the bottom surface 24 extending the length 16 of the main body 14. It is further preferred that the membrane 22 reside in the cavity 46 such that its center is offset from the opening 38 of the base 28 (FIG. 3). This offset allows the membrane 22 to be flipped over and reused in the fixture 10.

In a preferred embodiment, the membrane length 42 ranges from about 20 cm to about 40 cm, the membrane width 40 ranges from about 5 cm to about 10 cm, and the membrane depth 44 ranges from about 5 cm to about 20 cm. In a preferred embodiment, the membrane 22 is composed of a solid piece of electrically insulative material, of for example, natural or synthetic rubbers, neoprene, nylon or silicone.

Figure 4:
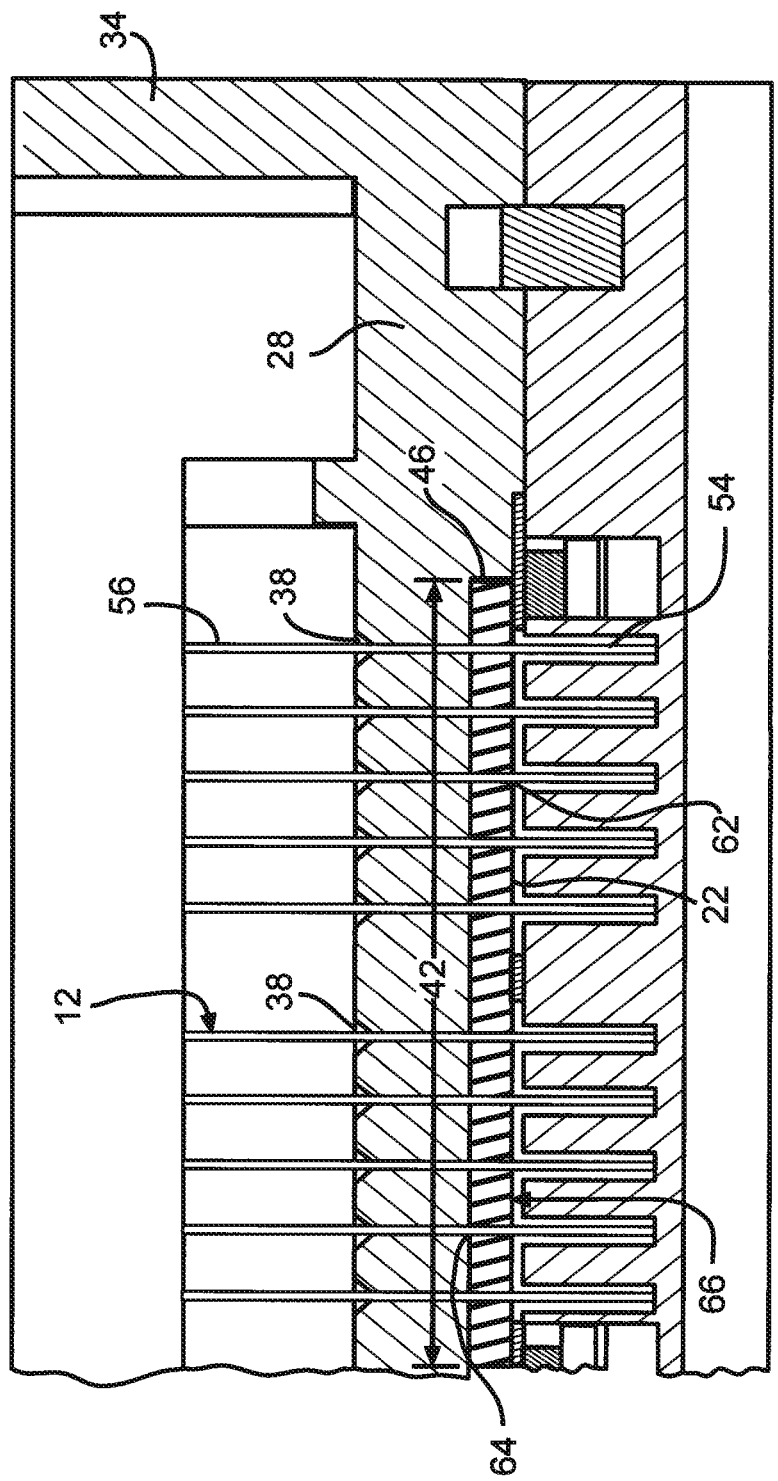
FIG. 4 is a magnified cross-sectional side view illustrating an embodiment of terminal leads in the fixture.
Figure 5:
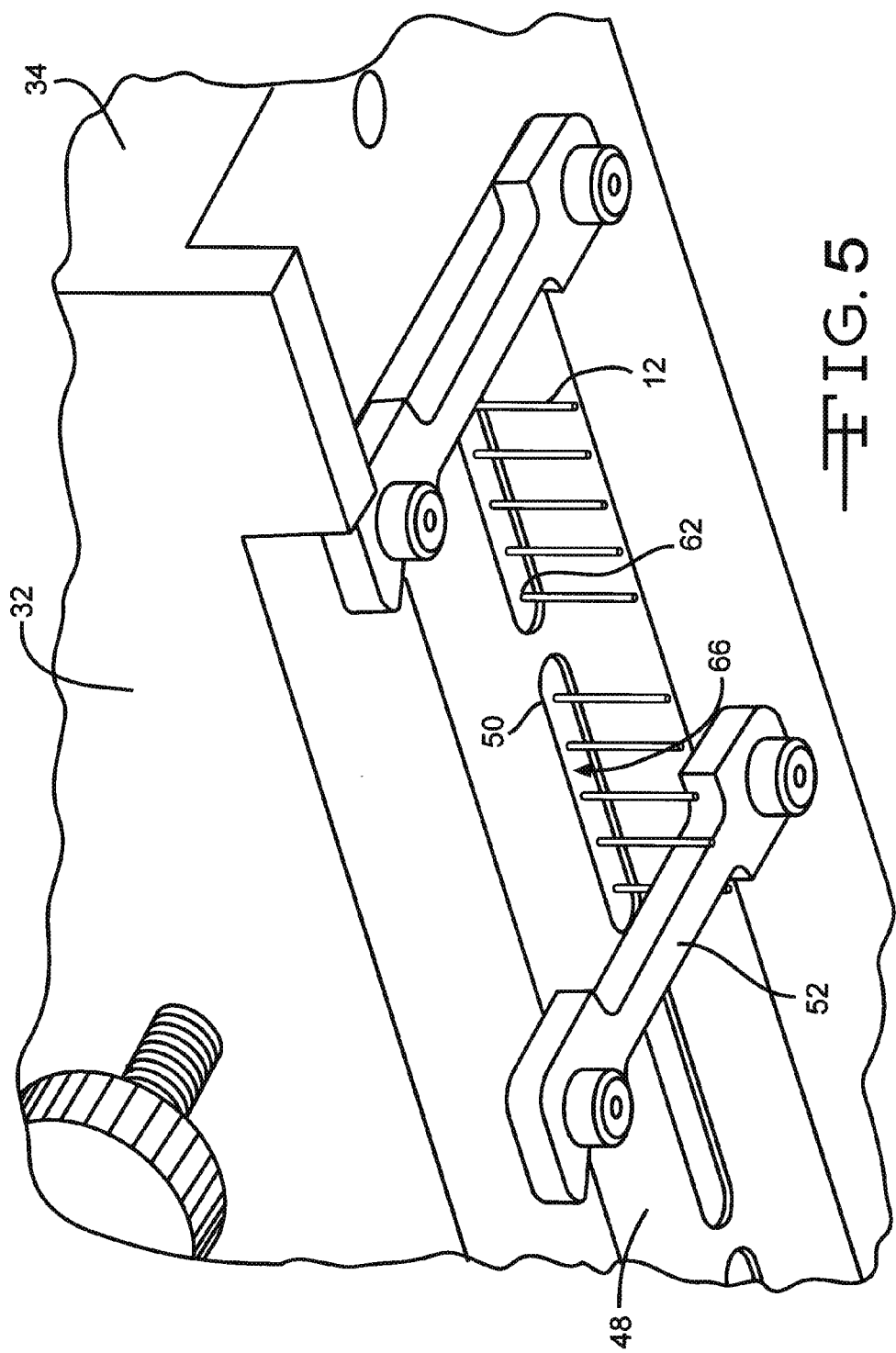
FIG. 5 shows a magnified perspective view of the bottom of the fixture.

A support plate 48, illustrated in FIGS. 3-6, may be positioned at the bottom of the main body 14, along the bottom surface of the membrane 22. The support plate 48 is designed to provide structural support to the fixture 10 and help retain the membrane 22 within the cavity 46. The support plate 48 further has a series of support plate openings 50 which allow the terminal pins 12 to pass through. A clamp 52, positioned perpendicular to the longitudinal axis A-A, extends across the bottom of the base 28 and preferably retains the membrane 22 and/or support plate 48 therewithin (FIGS. 3, 5). The clamp 52 is preferably positioned across the bottom surface of the support plate 48 or the bottom surface of the membrane 22 to ensure that the membrane 22 is retained in the cavity 46 at the bottom of the main body 14. This support plate 48 further provides rigidity to the fixture 10 as well as ensuring that the membrane 22 does not move during the plating process.

In a preferred embodiment, the plurality of terminal leads 12, each having a proximal lead portion 54 and a distal lead portion 56, is placed in a vertical orientation through a representative opening 38 of the bottom surface 24 of the main body 14. The distal portion 56 of the lead 12 is herein defined as the portion of the terminal lead 12 that extends into the electrochemical cell 110. The proximal portion 54 of the lead 12 is herein defined as the portion of the lead 12 that extends out of the electrochemical cell 110. The proximal portion 54 of the terminal lead therefore is considered to be a plated surface portion 58 of the lead 12 and the distal portion 56 of the lead 12 is considered to be a non-plated surface portion 60.

Figure 2:
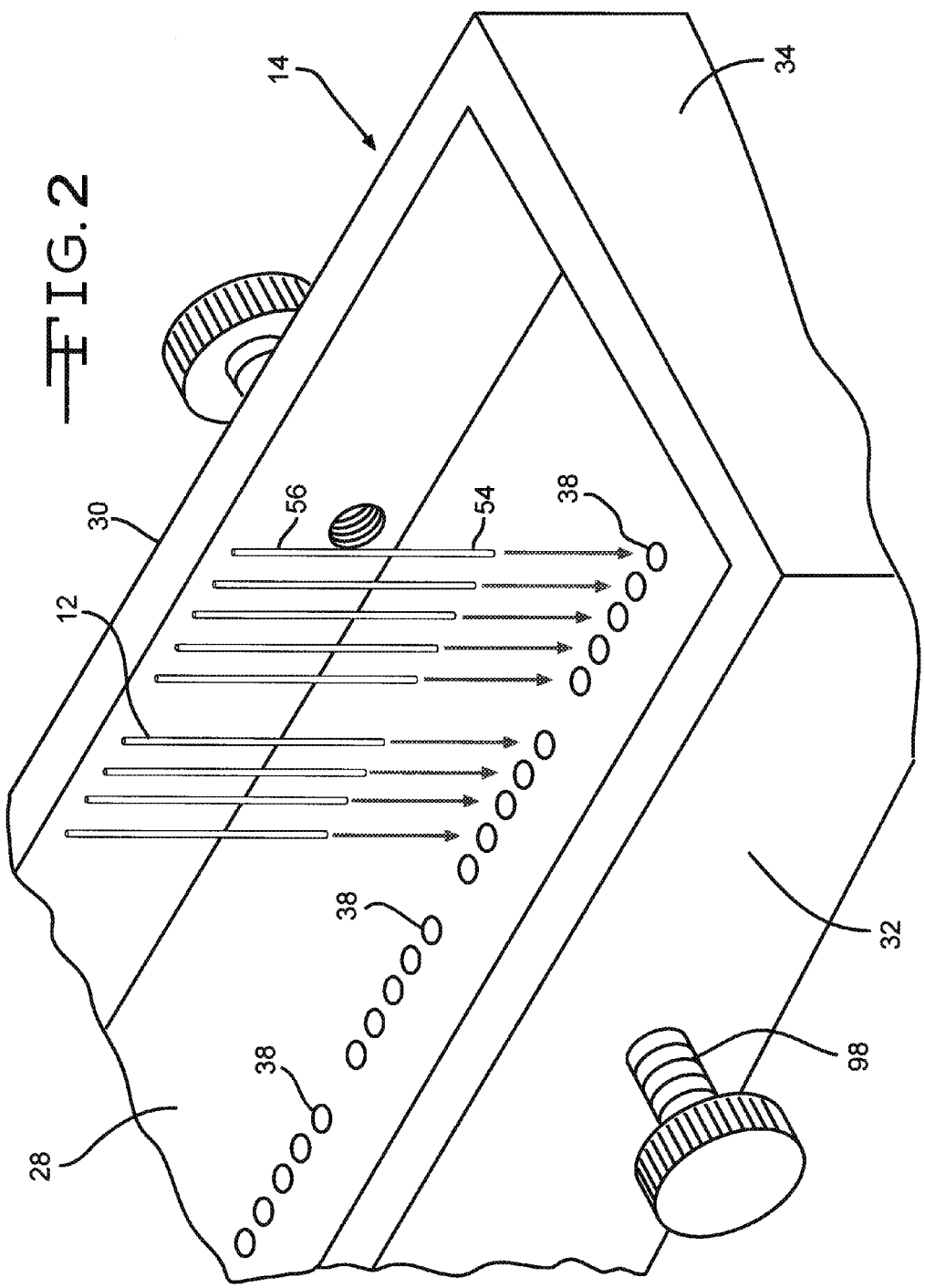
FIG. 2 is a magnified perspective view of terminal leads being inserted into the fixture.

As illustrated in FIGS. 2-4, it is further preferred that the proximal lead portion 54 is positioned through the opening of the bottom surface 24 of the main body 14 and through the membrane 22 positioned below the body 14. Terminal leads 12 are typically composed of an electrically conductive metal. Preferably, the terminal lead 12 is comprised of molybdenum and/or associated molybdenum alloys. However, the terminal lead 12 can also be comprised of other electrically conductive metals, such as stainless steel, high ferritic stainless steel, titanium, niobium, tantalum, and their associated alloys. Each terminal lead 12 preferably has a lead length that ranges from about 2 cm to about 10 cm and a diameter that ranges from about 0.01 cm to about 0.2 cm.

As each of the terminal leads 12 is positioned through the opening 38 of the base 28, the proximal end 54 of the lead 12 pierces the top surface of the membrane 22 and penetrates through the depth 44 of the membrane 22 and through the bottom surface thereof. This piercing action ensures a liquid tight seal 62 around the diameter of the lead 12, particularly at the point where the distal end 56 of the lead 12 exits the membrane 22 at its bottom surface. The membrane 22 acts like a gasket in that it a self sealing fit is created between the membrane 22 and terminal lead 12 around the surface of its diameter.

In an alternate embodiment, the membrane 22 may have a slit-opening 64 with a diameter that is smaller than the base opening 38. In this alternatively preferred embodiment, a liquid tight seal 62 is also formed around the diameter of the terminal lead 12. More specifically, the seal 62 is formed around the circumference of the terminal lead 12 where the surface of the lead 12 interfaces with the membrane 22 at a bottom surface 66 thereof. It is at this point where the bottom surface 66 of the membrane 22 contacts and encircles the perimeter of the terminal lead 12, that a distinct demarcation line 68 is created, delineating the plated lead surface portion 58 from the non-plated, bare metal surface portion 60.

Both preferred embodiments are designed to prevent electroplating chemicals from migrating or wicking up the surface 60 towards the distal end 56 of the terminal lead 12. This ensures that the demarcation line 68 delineating the plated surface portion 58 from the non-plated surface portion 60 is uniform around the perimeter of the lead 12 and is also repeatably reproduced amongst the plurality of terminal leads 12.

In a preferred embodiment, the set plate 26, having a set plate length 70 and a set plate width 72, is positioned below the base 28 of the main body 14. The length 70 and width 72 of the set plate 26 is dimensioned to approximate the dimensions of the main body 14 of the electroplating fixture 10. The set plate 26 is attached to the bottom of the main body 14 by a series of screws or fasteners.

In a preferred embodiment, the set plate 26 has a plurality of platforms 74 that reside on a top surface 76 of the set plate 26. These platforms 74 have a platform length 78, a platform width 80 and a platform height 82. The platforms 74 are preferably composed of an electrically insulative material, such as a polymer and, more preferably, a high-density polymer. A plurality of platform wells 84 extend from a top surface 86 of the platform 74 into a portion of the platform height 82. In a preferred embodiment, the platform wells 84 are aligned with the openings 38 of the base 28 of the main body 14. The platform wells 84 provide an alignment aid such that the leads 12 are positioned in an orientation vertical to the longitudinal axis A-A, thereby ensuring that the plating demarcation line 68 is parallel to the longitudinal axis A-A.

In a preferred embodiment, the set plate 26 determines the length of the plated surface portion 58 of the terminal lead 12. The platforms 74 of the set plate 26 are designed with varying heights 82 that range from about 0.5 cm to about 5 cm. As the terminal lead 12 is positioned through the fixture 10, the platform 74 acts as a "backstop" that uniformly sets the length to which leads 12 extend beyond the bottom of the fixture 10. The proximal portion 54 of the lead 12 is positioned into the well 84 of the platform 74 until the proximal end of the lead 12 contacts the bottom of the well 84. Therefore, the length of the plated surface portion 54 of the plurality of the terminal leads 12 is determined by the length between the bottom surface of the membrane 22 and the bottom of the platform well 84.

Furthermore, the height of the platform 74 also contributes to the length of the plated portion 54. For example, a platform 74 having a shorter height 82 will provide a longer lead plated surface portion 58 than a platform having a shorter height 82. Alternatively, the screws or fasteners that attach the set plate 26 to the main body 14, could also be tightened or loosened thereby positioning the set plate 26 in a more proximal or distal position relative to the plane of the bottom of the main body 14.

During the initial setup of the fixture 10, the set plate 26 is attached to the bottom of the body 14 as shown in FIGS. 1, 3 and 4. A set of screws or fasteners is threaded into the corners of the main body 14, thus securing it thereof. The terminal leads 12 are then positioned in a vertical orientation through the opening 38 of the base 28 of the main body 14. Once positioned through the base openings 38, the terminal leads 12 are pierced through the membrane 22, penetrating the top surface of the membrane and exiting the bottom surface thereof. The proximal end portion 54 of the lead 12 continues into the platform well 84. Once the terminal leads 12 are uniformly positioned in the fixture 10 and the appropriate plating length has been set by the set plate 26, the set plate 26 is removed from the bottom of the main body 14 of the fixture.

Figure 6:
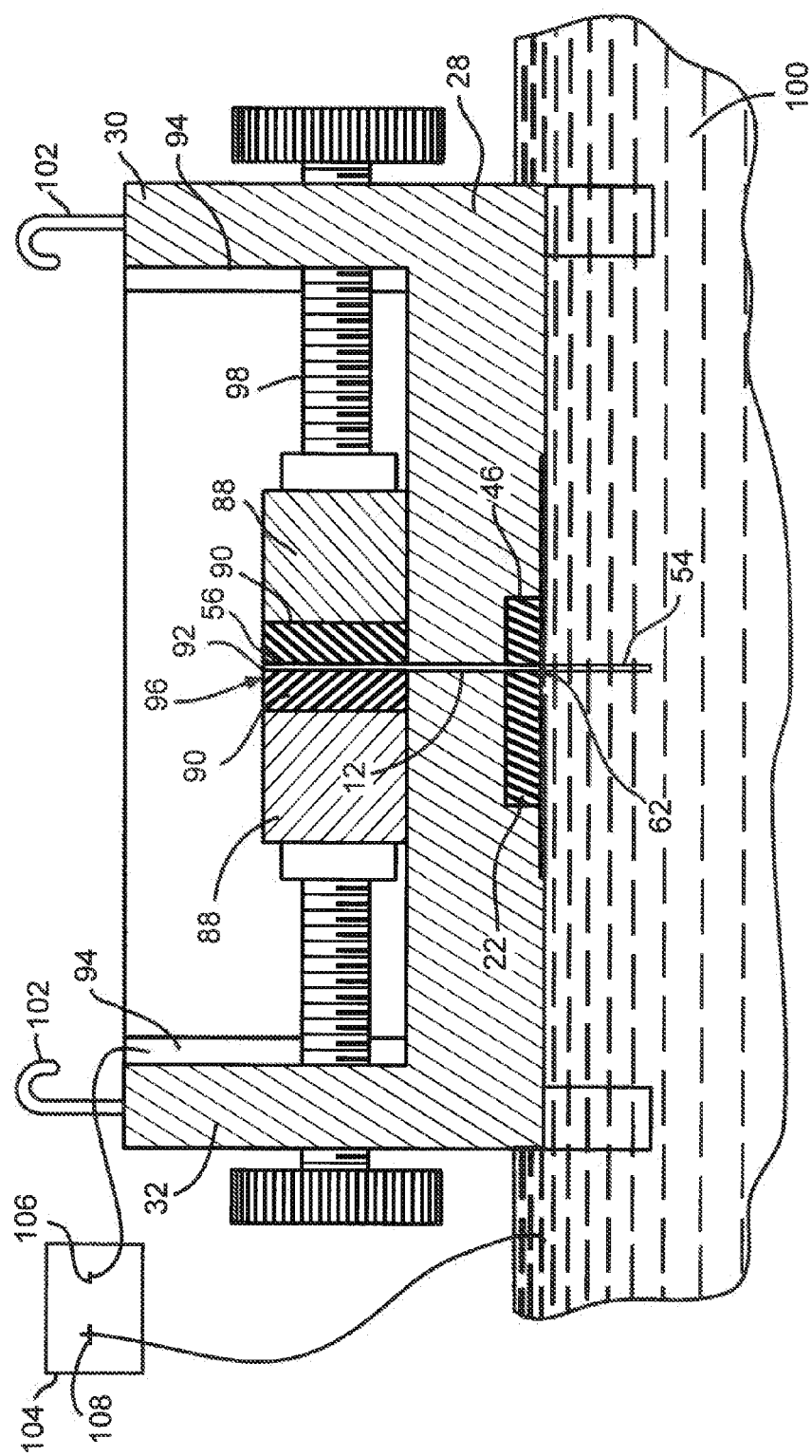
FIG. 6 illustrates a cross-sectional view from the end showing the fixture in the plating bath.

Once the set plate 26 has been removed from the bottom of the fixture 10, the electrode sub-assembly comprising a set of electrode rods 88, is positioned adjacent the terminal leads 12 as shown in FIGS. 1, 3, and 6. In a preferred embodiment, the electrode rods 88 are positioned alongside the terminal leads 12 within the main body 14 such that the rods 88 are parallel to the longitudinal axis A-A. The electrode rods 88 are designed to provide electrical conduction between the terminal leads 12 and an electrical power source 104 (FIG. 6).

As such, these electrode rods 88 are preferably composed of an electrically conductive material such as copper. Alternatively, the electrode rods 88 could be composed of an electrically insulative material such as a polymer. As shown in the embodiments of FIGS. 1, 3 and 6, a rubber pad 90 may be attached to the surface of the electrode rod 88. The rubber pad 90 provides a cushioned surface that protects the terminal leads 12 from damage as the electrode rods 88 are compressed against the leads 12. It is therefore preferred that a foil 92 of electrically conductive metal, particularly copper, is placed on the surface of the rubber pad 90 to establish electrical connection between the terminal leads 12 and the electrical power source 104.

An electrode post 94 is preferably attached to an end of the electrode rod 88. As illustrated in FIG. 1, the electrode post 94 provides a means of electrically connecting the electrode rod 88 to the electrical power source 104. In a preferred embodiment, each of the electrode rods 88 has an electrode post 94 that is attached to an electrically conductive surface of the rod 88, either the copper foil 92 or an electrically conductive surface 96 of the electrode rod 88 itself. Therefore, an electrical circuit is formed between the terminal leads 12, electrode rod 88, electrode post 94 and electrical power source 104.

After the electrode rods 88 are positioned alongside the terminal leads 12 as shown in FIGS. 1-3, a series of setscrews 98 are tightened against the electrode rods 88. As shown in FIGS. 3 and 6, the setscrews 98 are tightened against the side of the electrode rods 88 thereby compressing them against the surface of the terminal leads 12. This preferred orientation of the electrode rods 88 ensures that they remain in position against the terminal leads 12 throughout the plating process.

Once the terminal leads 12 are secured in the fixture 10, and the sub-assembly of the electrode rods 88 has been tightened against the surface of the terminal leads 12, the fixture is lowered into an electrode plating bath 100. A series of hooks 102 preferably positioned at the four corners of the topside of the fixture 10, provides a means in which the fixture is lowered into the plating bath 100 such that the bottom surface 24 of the fixture 10 resides in the bath 100.

Once the fixture 10 is lowered in the plating bath 100, at least one of the electrode posts 94 is connected to the electrical power source 104. The electrode post 94 is electrically connected to a cathode or negative terminal 106 of the power source 104. An anode or positive terminal 108 of the power source 108 is connected to a conductive surface within the plating bath 100. This preferred electrical connection provides for an electrochemical circuit that plates the exposed portion of the terminal leads 12 that extend below the bottom of the membrane 22 within the plating bath 100.

The plating fixture 10 of the present invention is designed to be used with any non-limiting electroplating bath 100 compositions using standard electroplating procedures. The plating bath 100 may comprise electroplating chemicals that are known to those skilled in the art. In a preferred embodiment, the electroplating bath 100 comprises a metal constituent not limited to nickel, gold, silver, palladium, platinum, and combinations thereof thereby providing a layer of nickel, gold, silver, palladium, platinum or combinations thereof onto the surface of the terminal lead 12.

It is understood that these electroplating process steps may be modified by one of ordinary skill in art. It is preferred however that the electroplating process achieve a metal layer thickness of about 0.01 um to about 25 um, more preferably from about 0.2 um to about 10 um, and most preferably from about 0.5 um to about 5 um, that is directly adhered to the surface 58 of the terminal lead 12.

Figure 7:
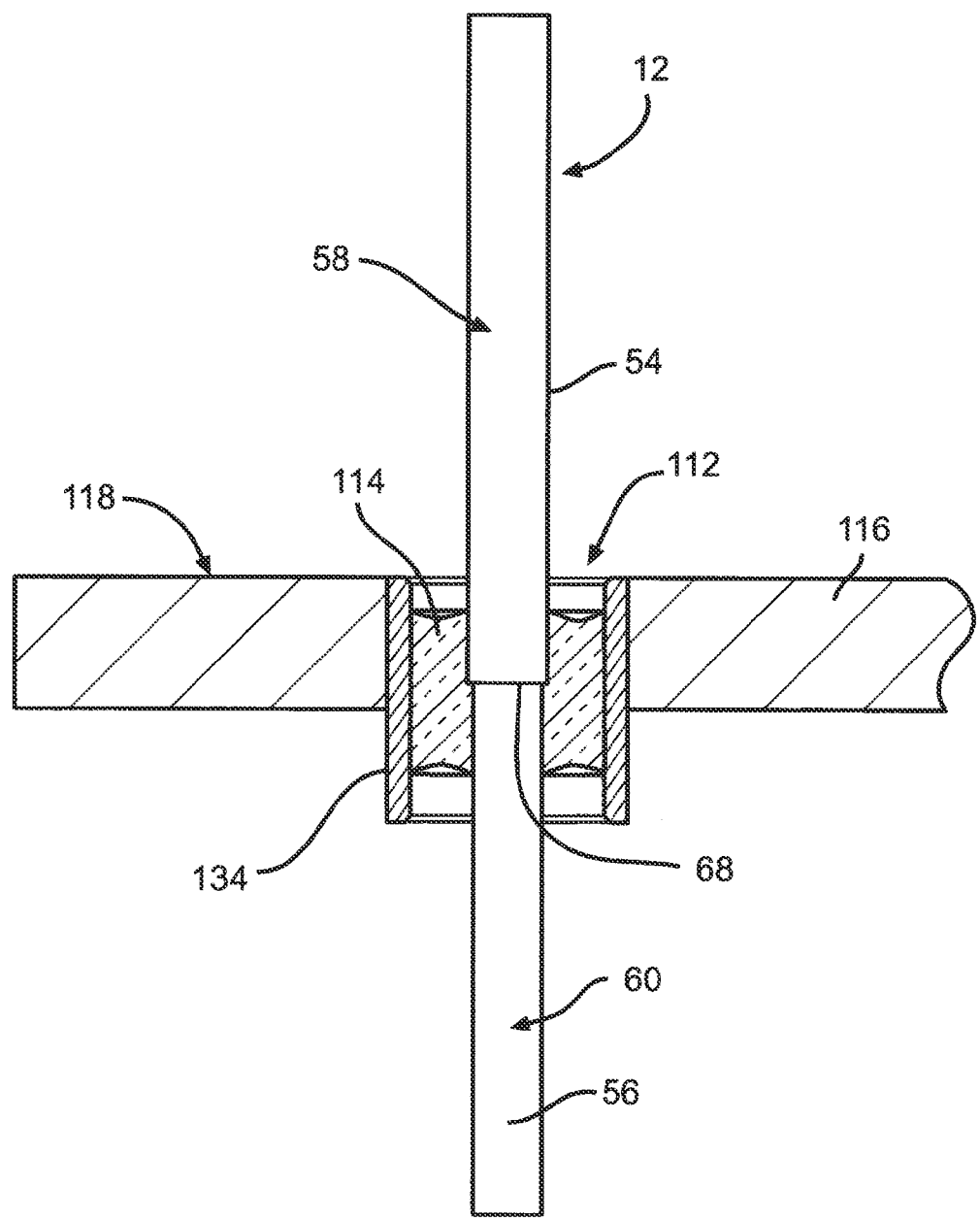
FIG. 7 illustrates a magnified perspective, partially broken view of an embodiment of a plated terminal pin residing in a glass-to-metal seal.
Figure 8:
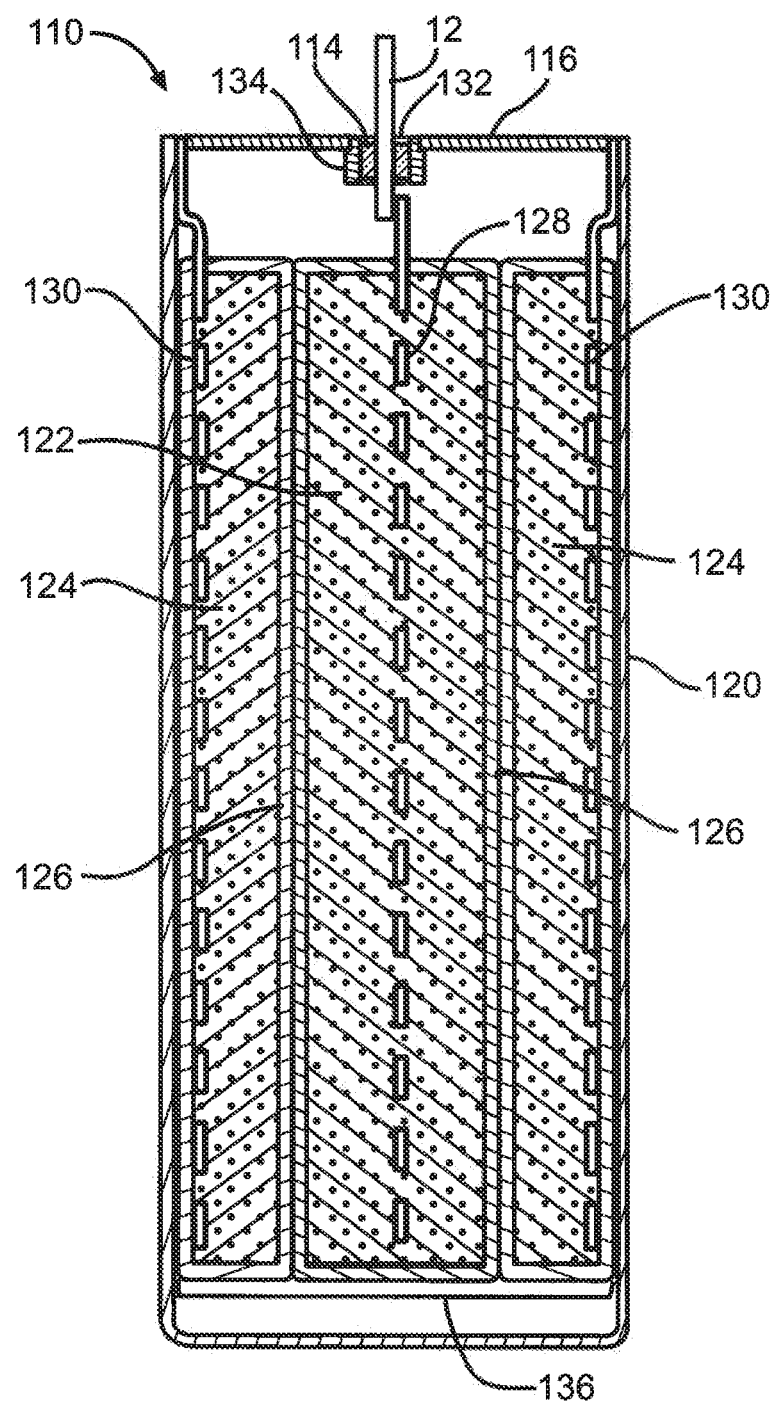
FIG. 8 is a cross-sectional view of an electrochemical cell comprising a plated terminal pin utilizing the fixture of the present invention.

Once the terminal lead 12 is sufficiently plated, it is then ready for incorporation into an electrochemical cell 110 (FIG. 8). More specifically, the plated terminal lead 12 is positioned within a glass-to-metal seal 112 of the electrochemical cell 110 as illustrated in FIGS. 7 and 8. As shown, the terminal lead 12 is positioned with the seal 112 such that it is encased within the glass 114. As shown, the demarcation line 68, delineating the proximal, plated surface portion 54 from the distal, non-plated surface portion 56 is positioned within the glass-to-metal seal 112, with the plated portion extending above a top surface 118 of a lid 116 of the cell 110.

FIG. 8 illustrates an example of an electrochemical cell 110 comprising the plated terminal lead 12. The electrochemical cell 110 further comprises a casing 120, a cathode electrode 122, an anode electrode 124, and a separator 126 therebetween. As shown, a cathode current collector 128 connects the cathode 122 to the terminal lead 12. An anode current collector 130 connects the anode 124 to the casing 120 and/or the lid 116 at the top of the cell 110. An electrolyte solution fills the casing 120 and provides a means for ion transfer between the anode 124 and the cathode 122.

The exemplary embodiment of a glass-to-metal seal 112 comprises the casing 120 having an opening 132 sized to receive a ferrule 134. The casing 120 can be the casing body itself or the lid 116 secured to the open end of a container housing the electrode assembly 136, as is well known by those of ordinary skill in the art. The ferrule 134 is a cylindrically-shaped member hermetically secured to the casing 120 in the opening 132, such as by welding. Preferably, the upper end of the ferrule 134 is flush with the outer surface of the casing 120. The ferrule 134 extends into the interior of the casing 120 and supports an insulating glass 114 surrounding the perimeter of the terminal lead 12. The terminal lead 12 is coaxial with the ferrule 134 with a distal end portion 56 extending into the interior of the casing 120. The distal end portion 56 is connected to one of the electrodes 122, 124, typically the current collector 128 of the cathode electrode 122. The proximal end portion 54 of the terminal lead 12 extends above the ferrule 134 and the outer surface of the casing 120 and provides for connection to one of the terminals of the load which the cell 110 is intended to power.

The other lead of the cell 110 is provided by the casing 120 electrically connected to the anode electrode 124. This electrode configuration is referred to as a case-negative design. As is well known by those of ordinary skill in the art, the cell 110 can also be provided in a case-positive configuration. In that case, the terminal lead 12 is connected to the anode current collector 130 and the cathode electrode 122 is electrically connected to the casing 120.

In any event, the glass 114 must be sufficiently resistive to electrically segregate the casing 120 from the terminal lead 12 but be sealed to and between the ferrule 134 and the terminal lead 12. This sealing relationship must be sufficiently hermetic so that the cell 110 is useful in applications such as powering implantable medical devices.

Suitable insulating glasses 114 are those glass compositions that create a hermetic seal. This insulating glass 114 may be in the form of a frit or cut glass tubing. Glass-to-metal seals can be of a matched seal where the coefficients of thermal expansions of all of the materials of construction are reasonably similar. Another type of glass-to metal seal comprises those in which the coefficient of thermal expansion of the ferrule sleeve 134 or of the casing body 120 is higher than that of the insulating glass 114 while the coefficients of thermal expansion of the terminal lead 12 and of the insulating glass 114 are substantially the same. Compression type glass-to-metal seals are shown in U.S. Pat. No. 3,225,132 to Baas et al., U.S. Pat. No. 4,053,692 to Dey, U.S. Pat. No. 4,430,376 to Box and U.S. Pat. No. 4,587,144 to Kellerman et al.

Furthermore, the glass-to-metal seal can be of a reverse mismatched compression seal where the coefficient of thermal expansion of the insulating glass 114 is less than that of the terminal lead 12. Typically, in a reverse mismatch compression seal, the ferrule 134 or casing body 120 has a coefficient of thermal expansion which is substantially similar to or significantly greater than that of the terminal lead 12, as described by Frysz et al. in U.S. Pat. No. 6,759,163, incorporated herein. It is preferred that the insulting glass 28 comprise CABAL-12, which is commercially available from Sandia National Laboratories. Other non-limiting examples of insulting glasses include FUSITE 435 and TA-23.

By way of example, in an illustrative cell 110 according to the present invention, shown in FIG. 8, an anode active material is an alkali metal selected from Group IA of the Periodic Table of Elements is contacted to a nickel current collector 130. The cathode active material is of a carbonaceous material, fluorinated carbon, metal, metal oxide, mixed metal oxide or a metal sulfide, and mixtures thereof. Preferably, the cathode material is mixed with a conductive diluent such as carbon black, graphite or acetylene black or metal powders such as nickel, aluminum, titanium and stainless steel, with a fluro-resin powder binder material such as powered polytetrafluroethylene or powdered polyvinylidene fluoride. The thusly prepared cathode active mixture is contacted to the cathode current collector 128 which is a thin sheet or metal screen, for example, a titanium, stainless steel, aluminum or nickel screen.

The separator 126 is of an electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reactions of the cell 110. Illustrative separator materials include woven and unwoven fabrics of polyolefinic fibers or fluoropolymeric fibers including polyvylidine fluoride, polyethylenetetrafluoroethylene, and polyethylenechlorotrifluoroethylene laminated or superposed with a polyolefinic or fluoropolymeric microporous film. Suitable microporous films include a polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.). The separator 126 may also be composed of nonwoven glass, glass fiber materials and ceramic materials.

The exemplary cell 110 illustrated in FIG. 8 is activated with an ionically conductive electrolyte which serves as a medium for migration of ions between the anode 124 and the cathode 122 electrodes during the electrochemical reactions of the cell 110. By way of example, a suitable electrolyte for an alkali metal active anode has an inorganic or organic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The ionically conductive salt serves as the vehicle for migration of the anode ions to intercalate or react with the cathode active material. Preferably the ion-forming alkali metal salt is similar to the alkali metal comprising the anode 124.

A preferred material for the casing 120 is stainless steel although titanium, mild steel, nickel-plated mild steel and aluminum are also suitable. The casing header comprises a metallic lid 116 having a sufficient number of openings 132 to accommodate the glass-to-metal seal having the terminal lead 12 connected to the cathode electrode 122. An additional opening (not shown) is provided for electrolyte filling. The casing lid 116 comprises elements having compatibility with the other components of the electrochemical cell 110 and is resistant to corrosion. The cell 110 is thereafter filled with the electrolyte solution described hereinabove and hermetically sealed such as by close-welding a stainless steel plug over the fill hole opening, but not limited thereto. The cell 110 of the present invention can also be constructed in a case-positive design.

Further, the exemplary cell 110 is readily adaptable to secondary, rechargeable electrochemical chemistries. A typical negative electrode for a secondary cell is fabricated by mixing about 90 to 97 weight percent "hairy carbon" (U.S. Pat. No. 5,443,928 to Takeuchi et al.) or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector 128, 130 such as of a nickel, stainless steel, or copper foil or screen by casting, pressing, rolling or otherwise contacting the admixture thereto.

In secondary cells 110, the positive electrode 124 preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCO_{0.92}SnO_{0.08}O_2$ and $LiCo_{1-x}Ni_xO_2$. The secondary cell chemistry is activated by the previously described electrolytes.

To charge such secondary cells 110, the lithium metal comprising the positive electrode 124 is intercalated into the carbonaceous negative electrode by applying an externally generated electrical potential to the cell 110. The applied recharging electrical potential serves to draw lithium ions from the cathode active material, through the electrolyte and into the carbonaceous material of the negative electrode 122 to saturate the carbon. The resulting $Li_xC_6$ negative electrode 122 can have an x ranging between 0.1 and 1.0. The cell 110 is then provided with an electrical potential and is discharged in a normal manner.

It is appreciated that various modifications to the invention concepts described herein may be apparent to those skilled in the art without departing from the spirit and the scope of the present invention defined by the hereinafter appended claims.

What is claimed is:

1. An electroplating fixture assembly for plating a terminal lead, the fixture assembly comprising:

a) a main body extending along a longitudinal axis having a depth that extends from a base aligned substantially perpendicular from the longitudinal axis, the base having a bottom surface;

b) a membrane having a membrane depth that extends perpendicularly from the longitudinal axis, the membrane residing along the base bottom surface of the main body so that the membrane depth is aligned along the longitudinal axis;

c) a pedestal positionable below both the base bottom surface of the main body and the membrane along the longitudinal axis, wherein the pedestal has at least one pedestal well extending from an open well end to a bottom well wall part way through a depth of the pedestal and wherein the pedestal open well end is positionable adjacent the membrane; and d) wherein a terminal lead having a terminal lead length extending from a proximal terminal lead end to a distal terminal lead end is positionable within the main body so that the terminal lead length is oriented perpendicular to the longitudinal axis through the depth of the membrane, wherein the proximal terminal lead end resides above a top membrane surface and the distal terminal lead end extends beyond a membrane bottom surface.

2. The electroplating fixture assembly of claim 1 wherein the pedestal resides on a surface of a setup plate, wherein the setup plate is contactable to the base bottom surface of the main body so that the pedestal open well end is adjacent the membrane bottom surface.

3. The electroplating fixture assembly of claim 1 wherein a distance between a pedestal bottom well surface and the membrane bottom surface determines the length of a plated portion of the terminal lead.

4. The electroplating fixture assembly of claim 1 further comprising at least one electrode rod positioned within the main body and electrically contactable with the terminal lead.

5. The electroplating fixture assembly of claim 4 wherein the electrode rod electrically connectable to an electrical power source.

6. The electroplating fixture assembly of claim 1 wherein a demarcation line, positioned parallel to the longitudinal axis of the main body, extends around a perimeter of the terminal lead delineating a plated lead surface portion from a non-plated lead surface portion.

7. The electroplating fixture assembly of claim 1 wherein the membrane resides within a cavity within the base bottom surface of the main body.

8. The electroplating fixture assembly of claim 1 is configured to plate a metal selected from the group consisting of gold, nickel, silver, platinum, and palladium on an exterior surface of the terminal lead.

9. The electroplating fixture assembly of claim 1 wherein a releasable clamp secures the membrane along the base bottom surface of the main body.

10. The electroplating fixture assembly of claim 1 wherein a support plate secures the membrane along the base bottom surface of the main body.

11. The electroplating fixture assembly of claim 1 wherein a plurality of terminal leads is positionable within the fixture.

12. The electroplating fixture assembly of claim 1 wherein the plated terminal lead is configured for subsequent incorporation into an electrochemical cell.

13. An electroplating fixture assembly for plating a terminal lead, the fixture comprising:

a) a main body extending along a longitudinal axis having a depth that extends from a base aligned substantially perpendicular from the longitudinal axis, the base having a bottom surface;

b) a membrane having a membrane depth extending perpendicular from the longitudinal axis, the membrane residing along the base bottom surface of the main body so that the membrane depth is aligned along the longitudinal axis;

c) a setup plate contactable to the base bottom surface of the main body, wherein a pedestal resides on a surface of the setup plate, the pedestal having at least one pedestal well extending from an open well end to a bottom well wall part way through a depth of the pedestal and wherein the pedestal open well end is positionable adjacent the membrane; and d) wherein a terminal lead having a terminal lead length extending from a proximal terminal lead end to a distal terminal lead end is positionable within the main body so that the terminal lead length is oriented perpendicular to the longitudinal axis through the membrane depth, wherein the proximal terminal lead end resides above a membrane top surface and the distal terminal lead end extends beyond a membrane bottom surface.

14. The electroplating fixture assembly of claim 13 further comprising at least one electrode rod positioned within the main body, the electrode rod electrically contactable with the terminal lead and an electrical power source.

15. The electroplating fixture assembly of claim 13 wherein a distance between the pedestal bottom well surface and the membrane bottom surface determines the length of a plated portion of the terminal lead.

16. The electroplating fixture assembly of claim 13 is configured to plate a metal selected from the group consisting of gold, nickel, silver, platinum, and palladium on a surface of the terminal lead.

17. The electroplating fixture assembly of claim 13 wherein the membrane resides within a cavity within the base bottom surface of the main body.

18. The electroplating fixture assembly of claim 13 wherein a releasable clamp secures the membrane along the base bottom surface of the main body.

19. The electroplating fixture assembly of claim 13 wherein the plated terminal lead is configured for subsequent incorporation into an electrochemical cell.

* * * * *